United States Patent [19]

Twerdochlib

[11] Patent Number: 5,123,679
[45] Date of Patent: Jun. 23, 1992

[54] CONNECTION TOGETHER OF PIPES BY BREAKABLE WELDED JOINT

[75] Inventor: Michael Twerdochlib, Oviedo, Fla.

[73] Assignee: Westinghouse Electric Corp., Pittsburgh, Pa.

[21] Appl. No.: 662,646

[22] Filed: Mar. 1, 1991

[51] Int. Cl.$^5$ ............................................. F16L 13/04
[52] U.S. Cl. ................................... 285/114; 285/286; 285/367
[58] Field of Search ................. 285/286, 15, 93, 367, 285/114; 228/104, 191

[56] References Cited

U.S. PATENT DOCUMENTS

| | | | |
|---|---|---|---|
| 1,246,091 | 11/1917 | Haller | 285/286 |
| 1,771,739 | 7/1930 | Wise | 285/286 |
| 2,893,757 | 7/1959 | Holmes | 285/286 X |
| 3,211,477 | 10/1965 | McCoy | 285/286 |
| 3,603,616 | 9/1971 | Smith | 285/286 X |
| 4,131,302 | 12/1978 | Leonard | 285/286 X |
| 4,522,034 | 6/1985 | Laskaris | |
| 4,526,015 | 7/1985 | Laskaris | |
| 4,587,504 | 5/1986 | Brown et al. | |
| 4,688,132 | 8/1987 | Dustmann | |
| 4,838,477 | 6/1989 | Roach et al. | |

FOREIGN PATENT DOCUMENTS

| | | | |
|---|---|---|---|
| 410283 | 5/1934 | United Kingdom | 285/286 |
| 477476 | 12/1937 | United Kingdom | 285/286 |

*Primary Examiner*—Dave W. Arola
*Attorney, Agent, or Firm*—M. G. Panian

[57] ABSTRACT

A fluid conduit composed of: two pipe sections each having a longitudinal axis and a connecting end, each pipe section including a cylindrical main portion, an annular flange located at the connecting end and extending radially outwardly from the main portion, and a thin annular disk located at the connecting end, extending radially outwardly from the flange and having an outer periphery, the pipe sections being assembled together at the connecting ends with the disks in contact with one another; and a mass of welding metal sealing the outer peripheries of the disks together.

Such a connection can be broken by cutting off outer peripheral regions of the disks along a circular cutting line.

11 Claims, 1 Drawing Sheet

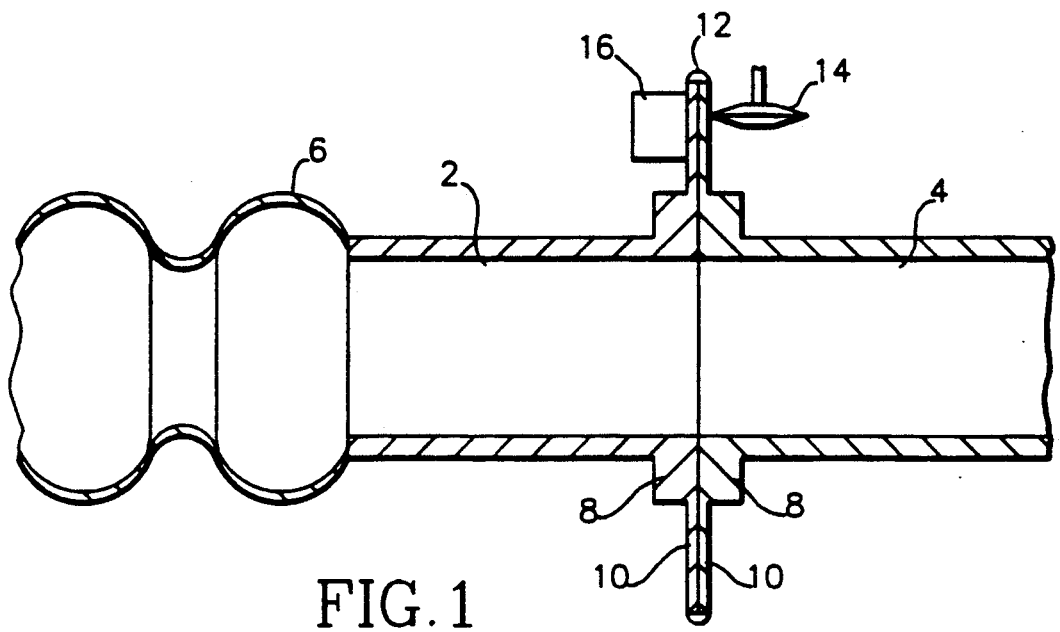
FIG. 1
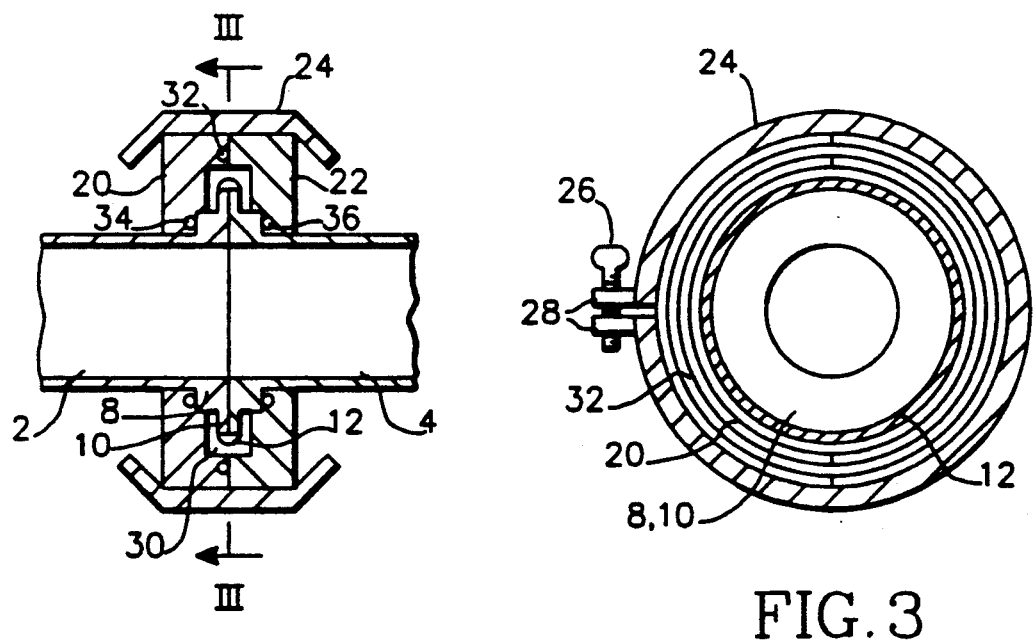
FIG. 2
FIG. 3

CONNECTION TOGETHER OF PIPES BY BREAKABLE WELDED JOINT

BACKGROUND OF THE INVENTION

The present invention relates to the connection together of lengths of pipe, via pipe joints, particularly for use in a system in which the connections must be periodically broken and then reestablished.

Various types of installations employ piping containing pipe joints which must be repeatedly broken and reestablished. This is the case, for example, for vacuum and cryogen delivery and return piping employed in the testing, installation and servicing of SSC-type dipole and quadrupole magnets in cryogenic systems.

It is the current practice to join lengths of pipe together for such installations by TIG or MIG butt welding. After testing of the magnet has been completed, each joint must be cut or ground to break the connection. If a magnet installed in an accelerator tunnel must be serviced, the pipe connections must be broken and subsequently reconnected. The required butt welding operation is a time consuming procedure.

Each cutting procedure for breaking a connection must be carried out under carefully controlled conditions to prevent contaminants and debris resulting from the cutting operation from being conveyed to the magnet.

In situations where large diameter piping is employed for such purposes, the connection must be capable of withstanding substantial longitudinal forces associated with leak testing of the welded joint. The forces generated by conventional leak tests are sufficient to break posts supporting the pipeline.

SUMMARY OF THE INVENTION

It is an object of the present invention to provide pipeline connections which eliminate, or at least minimize, the above-mentioned difficulties.

Another object of the invention is to provide a pipe joint which can be easily broken one or more times without requiring replacement of the pipe sections and without introducing contaminants or debris to the interior of the pipeline.

A further object of the invention is to provide effective mechanical support for such pipe connections.

Yet another object of the invention is to allow pipe joints to be tested for leaks without imposing significant longitudinal stresses on the joints.

The above and other objects are achieved, according to the present invention, by a fluid conduit comprising two pipe sections each having a longitudinal axis and a connecting end, each pipe section including a cylindrical main portion, an annular flange located at the connecting end and extending radially outwardly from the main portion, and a thin annular disk located at the connecting end, extending radially outwardly from the flange, and having an outer periphery, the pipe sections being assembled together at the connecting ends with the disks in contact with one another; and a mass of welding metal sealing the outer peripheries of the disks together.

BRIEF DESCRIPTION OF THE DRAWING

FIG. 1 is a cross-sectional view illustrating one embodiment of a pipe joint according to the present invention.

FIG. 2 is a cross-sectional view illustrating an embodiment of a pipe joint and mechanical support structure according to the invention.

FIG. 3 is a cross-sectional view taken along the line III—III of FIG. 2.

DESCRIPTION OF THE PREFERRED EMBODIMENTS

FIG. 1 illustrates two sections of pipe 2 and 4 provided at their ends with connecting structures according to a preferred embodiment of the present invention. The other end of pipe section 2 is connected to a bellows 6 permitting longitudinal movements of the pipeline, or of a device connected to the pipeline, under the influence of temperature variations.

The connecting structure according to the present invention includes, at the connecting end of each pipe section 2, 4, a relatively thick mating flange 8 and a comparatively thin disk 10 which projects radially outwardly from its associated flange 8. Both flange 8 and disk 10 terminate at a common plane which constitutes the mating plane between sections 2 an 4.

Pipe sections 2 and 4 are then connected together by a seal weld 12 formed at the outer peripheries of disks 10. For smaller diameter pipes, i.e. those having a diameter not greater than approximately 15-16 cm, such a seal weld provides both adequate mechanical strength and an effective hermetic seal.

Preferably, weld 12 is formed by causing molten metal to flow in a single axial direction across the peripheral surfaces of both disks 10. This permits the weld to be formed more quickly and reduces the chances of leaks.

With the arrangement according to the present invention, weld 12 can be thinner than the main walls of pipe sections 2 and 4 and could, for example, have a thickness corresponding to that of bellows 6.

When the welded joint must be broken, this can be achieved easily by severing the outermost portions of disks 10. Since these disks are relatively thin, severing can be achieved quickly and easily, for example by use of a hand operated cutting device including a cutting wheel 14 cooperating with a cutter backing plate 16. When such a cutting device is employed, it is only necessary to rotate cutting wheel 14 and backing plate 16 around the circumference of the pipe joint while advancing cutter wheel 14 axially toward backing plate 16 by means of a mechanism well known in the art.

What remains after the cutting operation is a clean, circular outer edge via which the connection between pipe sections 2 and 4 can be reestablished by a new manual or automated weld. At the same time, because pipe sections 2 remain, or can be held, in contact along their common mating plane, any debris which may be created by the cutting operation cannot find its way to the interior of the pipeline. In practice, the type of cutting operation which can be performed in accordance with the invention will not produce any debris.

While the joint illustrated in FIG. 1 is satisfactory for smaller diameter pipes, it will not provide the degree of mechanical support required by larger diameter pipes. In addition, it is somewhat difficult to test the connection shown in FIG. 1 for leaks.

Therefore, according to a further aspect of the present invention, the weld connection illustrated in FIG. 1 is supplemented, as shown in FIG. 2, by a mechanical clamp assembly including two clamping members 20 and 22 and a circular clamp ring 24. Depending on the overall configuration of pipe sections 2 and 4, each clamping member 20, 22 may be a one-piece member or may, if necessary, be constituted by two semicircular halves which are placed around the associated pipe section, 2, 4 to establish the annular clamping member.

Each clamping member 20, 22 is shaped so that a region adjacent the inner periphery thereof bears axially against an associated flange 8. In addition, clamping members 20 and 22 are formed so that regions adjacent the outer peripheries thereof press against one another. After clamping members 20, 22 have been properly positioned, as shown in FIG. 2, clamping ring 24 is brought into position and is then tightened against members 20 and 22 by means of a clamping screw 26 that passes through ears 28 projecting radially outwardly from the free ends of clamping member 24. Clamping ring 24 is configured so that when tightened, it acts on members 20 and 22 in a manner to press disks 10 axially against one another.

In the case of large diameter pipe lines, hermetic sealing of the joint is provided essentially by weld 12, while substantially all mechanical support is provided by clamping assembly 20-28. Because the mechanical support is provided by a separate clamping assembly, disks 10 can be made relatively thin, even for large diameter pipes, so that cutting off of the weld joint can be performed in a short time.

According to a further feature of the present invention, clamping members 20 and 22 are further configured to create a chamber 30 around disks 10 and weld 12 and this chamber is sealed by three O-rings 32, 34 and 36. O-ring 32 is disposed between clamping members 20 and 22 in the region adjacent their outer peripheries, O-ring 34 is disposed between clamping member 20 and flange 8 of pipe section 2 and O-ring 36 is disposed between clamping member 22 and flange 8 of pipe section 4.

With chamber 30 thus being sealed, this chamber can be employed for testing the fluid tightness of the seal provided by weld 12. With a high vacuum established in chamber 30, an effective leak check can be performed by delivering helium at a pressure of only one atmosphere absolute into the pipeline. A vacuum connection can be introduced through one of clamping members 20 and 22 for establishing an initial vacuum in chamber 30 and for subsequent monitoring for the presence of helium gas in that chamber. The leakage of helium into chamber 30 can be monitored by a helium leak detector which may be connected to in chamber 30 through one of clamping members 20 and 22. Because of the small volume of chamber 30, it can be evacuated to the desired vacuum level in a short period of time.

With this arrangement, the seal provided by weld 12 can be tested down to a leakage rate of $10^{-9}$ cc atm per second.

In contrast, existing leak testing techniques require the establishment of a pressure in the pipeline which is high enough to create the danger that posts supporting the pipeline will be broken.

The ease with which a weld connection can be cut depends to a substantial extent on the thickness of disks 10. Ideally, disks 10 need be no thicker than required to give the connection the required mechanical strength, particularly in the case of small diameter pipes which do not require an additional clamping assembly. In installations where the clamping assembly is employed, disks 10 could be made even thinner. The thickness of disks 10 is preferably optimized, dependent on the type of metal employed, to produce the best weld characteristics and could be as small as 1/20 the thickness of pipe sections 2 and 4

While the description above refers to particular embodiments of the present invention, it will be understood that may modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A fluid conduit comprising: two pipe sections each having a longitudinal axis and a connecting end, each pipe section including a cylindrical main portion, an annular flange located at said connecting end and extending radially outwardly from said main portion, and a thin annular disk located at said connecting end, extending radially outwardly from said flange and having an outer periphery, said pipe sections being assembled together at said connecting ends with said disks in contact with one another; a mass of welding metal sealing said outer peripheries of said disks together; and a clamp assembly comprising two annular clamping members each bearing against said flange of a respective pipe section, and a clamping ring surrounding said clamping members and pressing said clamping members against one another.

2. A conduit as defined in claim 1 wherein said flange and disk of each said pipe section have axial end surfaces which lie in a common plane normal to the longitudinal axis of said pipe section.

3. A conduit as defined in claim 2 wherein, for each said pipe section, said disk has a thickness parallel to the longitudinal axis and said main portion has a thickness perpendicular to the longitudinal axis, and the thickness of said disk is less than the thickness of said main portion.

4. A conduit as defined in claim 3 wherein, for each said pipe section the dimension of said flange parallel to the longitudinal axis is greater than the thickness of said disk.

5. A conduit as defined in claim 4 wherein said mass of welding metal is located only adjacent the outer peripheries of said disks.

6. A conduit as defined in claim 1 wherein, for each said pipe section, said disk has a thickness parallel to the longitudinal axis and said main portion has a thickness perpendicular to the longitudinal axis, and the thickness of said disk is less than the thickness of said main portion.

7. A conduit as defined in claim 6 wherein, for each said pipe section the dimension of said flange parallel to the longitudinal axis is greater than the thickness of said disk.

8. A conduit as defined in claim 7 wherein said mass of welding metal is located only adjacent the outer peripheries of said disks .

9. A conduit as defined in claim 1 wherein said mass of welding metal is located only adjacent the outer peripheries of said disks.

10. A conduit as defined in claim 1 wherein said clamping members are formed to present an annular chamber surrounding said disks and said mass of welding metal.

11. A conduit as defined in claim 10 further comprising seal means associated with said clamping members for hermetically sealing said chamber from the environment surrounding said clamp assembly.

* * * * *